(12) United States Patent
Langenwalter

(10) Patent No.: US 10,436,166 B2
(45) Date of Patent: Oct. 8, 2019

(54) METHOD FOR OPTIMISING COMBUSTION IN COMBUSTION DEVICES AND DEVICE FOR PERFORMING THE METHOD

(71) Applicant: Synergetic Genesis International Limited, Mosta (MT)

(72) Inventor: Michael Langenwalter, Berlin (DE)

(73) Assignee: SYNERGETIC GENESIS INTERNATIONAL LIMITED, Mosta (MT)

( * ) Notice: Subject to any disclaimer, the term of this patent is extended or adjusted under 35 U.S.C. 154(b) by 135 days.

(21) Appl. No.: 15/570,480

(22) PCT Filed: May 2, 2016

(86) PCT No.: PCT/EP2016/059802
§ 371 (c)(1),
(2) Date: Oct. 30, 2017

(87) PCT Pub. No.: WO2016/174274
PCT Pub. Date: Nov. 3, 2016

(65) Prior Publication Data
US 2018/0142661 A1 May 24, 2018

Related U.S. Application Data

(60) Provisional application No. 62/201,282, filed on Aug. 5, 2015.

(30) Foreign Application Priority Data

Apr. 30, 2015 (EP) .................................... 15165979

(51) Int. Cl.
*F02M 27/02* (2006.01)
*F02N 11/08* (2006.01)
(Continued)

(52) U.S. Cl.
CPC .......... *F02N 11/0833* (2013.01); *B01D 53/32* (2013.01); *F02M 27/00* (2013.01);
(Continued)

(58) Field of Classification Search
USPC ....................... 123/1 A, 3, 26, 585, 536–539
See application file for complete search history.

(56) References Cited

U.S. PATENT DOCUMENTS 3,970,437 A   7/1976 Van Diepenbroeck et al.
4,230,072 A * 10/1980 Noguchi .................. F02B 1/02
                                                    123/1 A
(Continued)

FOREIGN PATENT DOCUMENTS

CN        1155623 A      7/1997
DE        2246891 A1     4/1974
(Continued)

*Primary Examiner* — George C Jin
*Assistant Examiner* — Teuta B Holbrook
(74) *Attorney, Agent, or Firm* — Kriegsman & Kriegsman

(57) ABSTRACT

Method and device for optimizing combustion in combustion devices. In one embodiment, the method includes providing an oxygen enriching device, wherein the oxygen enriching device comprises a chamber, the chamber comprising at least two sections, introducing ambient air in a laminar flow into a first section of the at least two sections, converting the laminar air flow from a translational movement into a rotational movement using spiral guiding surfaces disposed inside the first section of said at least two sections, ionizing ionizable components of the ambient air by applying ionization energy thereto in form of a pulsed direct current electric field, separating ionized components from non-ionized components by using the electric field, and introducing the separated ionized components into a combustion chamber of a combustion device, and discharging the separated non-ionized components from the oxygen (Continued)

enriching device by passing separated non-ionized compounds from the first section into the second section.

18 Claims, 4 Drawing Sheets

(51) Int. Cl.
*F02M 27/04* (2006.01)
*B01D 53/32* (2006.01)
*F02M 27/00* (2006.01)
*B01D 53/00* (2006.01)

(52) U.S. Cl.
CPC ............ *F02M 27/02* (2013.01); *F02M 27/04* (2013.01); *F02M 27/045* (2013.01); *B01D 53/00* (2013.01); *B01D 2256/12* (2013.01); *B01D 2257/102* (2013.01); *Y02T 10/48* (2013.01)

(56) References Cited

U.S. PATENT DOCUMENTS

| | | | | |
|---|---|---|---|---|
| 4,911,894 A | * | 3/1990 | Retallick | ................ B01D 53/86 422/174 |
| 5,010,869 A | * | 4/1991 | Lee | ........................ F02M 25/12 123/536 |
| 5,942,026 A | * | 8/1999 | Erlichman | ............. F02M 25/12 123/198 E |
| 7,603,991 B2 | * | 10/2009 | Rozim | ................... F02M 27/08 123/536 |
| 8,564,924 B1 | * | 10/2013 | Waddell | ................. H01T 23/00 361/231 |
| 2002/0142208 A1 | * | 10/2002 | Keefer | ................ B01D 53/047 429/411 |
| 2004/0065306 A1 | | 4/2004 | Parsa | |
| 2004/0139853 A1 | | 7/2004 | Bologa et al. | |
| 2006/0150614 A1 | * | 7/2006 | Cummings | ............. F01N 1/088 60/275 |
| 2011/0138765 A1 | * | 6/2011 | Lugg | ....................... F01D 15/10 60/39.01 |
| 2011/0174277 A1 | | 7/2011 | Socolove | |
| 2014/0020348 A1 | | 1/2014 | Yao et al. | |

FOREIGN PATENT DOCUMENTS

| | | | |
|---|---|---|---|
| DE | 2551075 A1 | 8/1976 | |
| DE | 3021661 A1 | 12/1981 | |
| DE | 102011011819 A1 | 8/2012 | |
| EP | 0578863 A1 | 1/1994 | |
| GB | 1474269 A * | 5/1977 | ........... F01N 3/0892 |

* cited by examiner

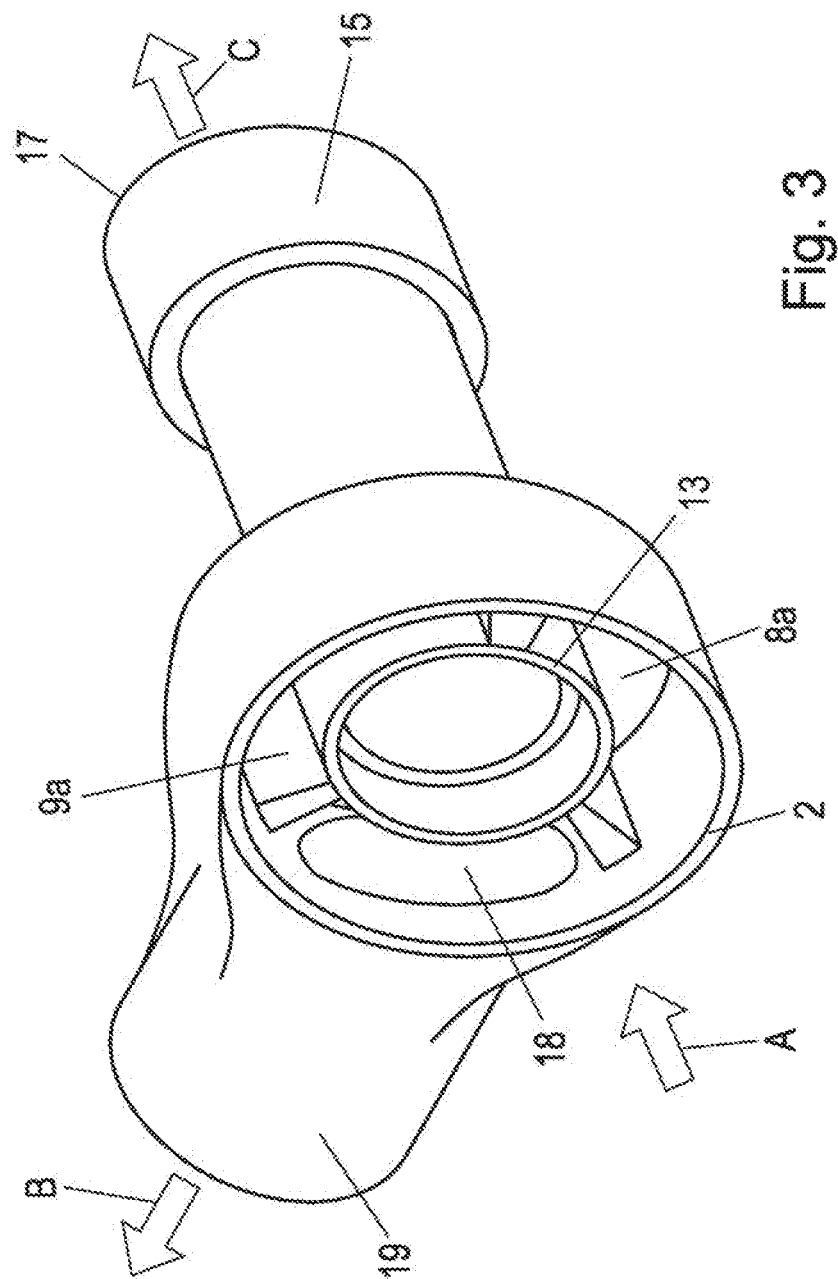

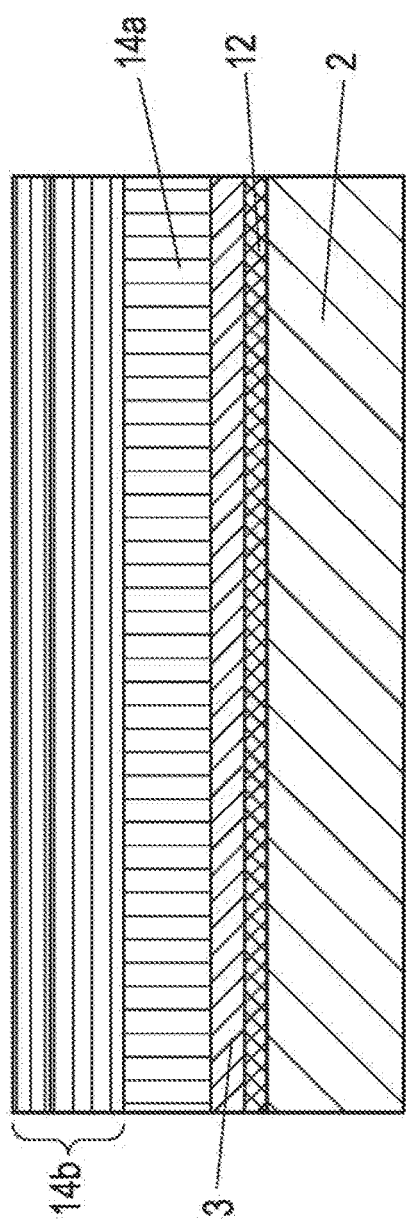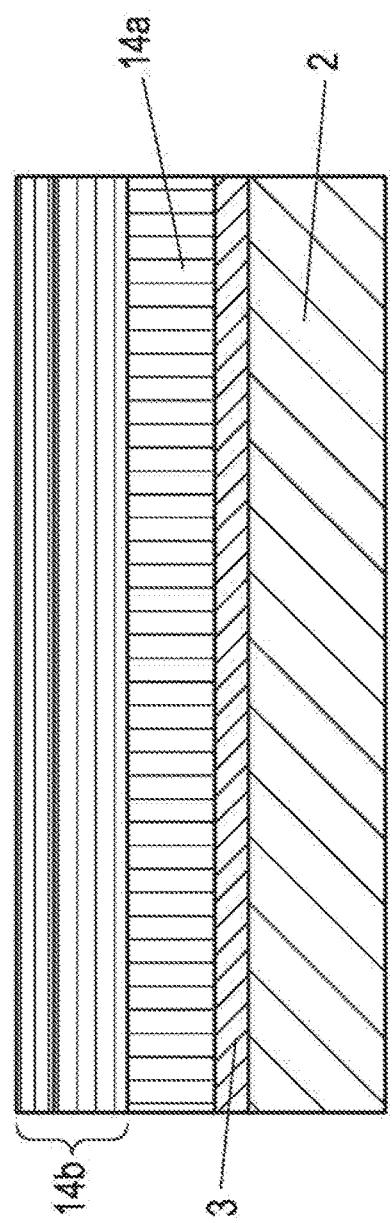

METHOD FOR OPTIMISING COMBUSTION IN COMBUSTION DEVICES AND DEVICE FOR PERFORMING THE METHOD

BACKGROUND OF THE INVENTION

The present invention relates to a method and a device for optimising combustion in combustion devices.

A device for increasing the amount of oxygen in an air mixture for combustion engines is disclosed in DE 10 2011 011 819 A1. The device consists of three consecutively connected airtight chambers, namely, a pressure chamber, an ionisation chamber and a separation chamber, as well as a voltage generator with a high negative voltage. Oxygen and nitrogen in the combustion engine introduced air are separated by means of an electric and magnetic field.

Further, DE 2 246 891 A1 discloses a method and a device for enriching the combustion air with atmospheric oxygen. The method combines the steps of ozonising atmospheric oxygen, separating oxygen and nitrogen by means of rotation acceleration and additional segregation into electromagnetic fields. The atmospheric oxygen is transferred into ozone by means of electric impulses and the ozonised air mixture is separated by means of rotational acceleration. Further separation is achieved by means of electromagnetic fields due to the paramagnetic properties of oxygen.

An arrangement for ionising the inlet system of a combustion engine is disclosed in DE 25 51 075 A1. A combustion engine is described comprising at least one combustion chamber, wherein combustions occur periodically. Further the atmospheric air flows through an air inlet system, where the atmospheric air is mixed with fuel. The arrangement consists of a source for periodic ionisation impulses, through which the ionisation impulses are coupled with the air inlet system. The mixture of air and fuel is ionised before combustion occurs by means of a strongly pulsed field produced by the impulses that load the recirculating mixture. The pulsed field produces free electrons which stick to the oil drops.

SUMMARY OF THE INVENTION

It is an object of the present invention to provide a new method and device for optimising combustion in combustion devices.

It is another object of the present invention to provide a method and device as described above that overcome at least some of the drawbacks associated with existing methods and devices for optimising combustion in combustion devices.

According to one aspect of the present invention, there is provided a method for optimising combustion in combustion devices, the method comprising the following steps.

a) providing an oxygen enriching device, wherein the oxygen enriching device comprises a chamber, the chamber comprising at least two sections,
b) introducing ambient air in a laminar flow into a first section of the at least two sections,
c) converting the laminar air flow from a translational movement into a rotational movement using spiral guiding surfaces disposed inside the first section of said at least two sections,
d) ionising ionisable components of the ambient air by applying ionisation energy thereto form of a pulsed direct current electric field,
e) separating ionised components from non-ionised components by using the electric field, guiding the separated ionised components over a catalytic layer, and introducing the separated ionised components into a combustion chamber of a combustion device, and
f) discharging the separated non-ionised components from the oxygen enriching device by passing separated non-ionized compounds from the first section into the second section.

In a preferred embodiment, the ambient air in step b) is introduced by suction feed and/or by air injection.

In a preferred embodiment, the ambient air in step b) is moistened during introduction.

In a preferred embodiment, the direct current in step d) is between 5 kV-100 kV and the pulse in step d) has a frequency that is between 5 Hz-60 kHz. The frequency of the pulse may be relative to the application and to the operation site; therefore, fluctuations of the frequency might occur.

In a preferred embodiment, the ionisable components in step d) are chosen from oxygen containing components of the ambient air.

In a preferred embodiment, the separation in step e) feeds oxygen components of the air into the combustion device whereas nitrogen components of the air in step f) are released into the environment.

According to another aspect of the present invention, there is provided a device that may be used to practice the above-described method, the device comprising an oxygen enriching device, wherein the oxygen enriching device comprises a chamber comprising at least two sections, wherein at least parts of the first section are formed by a casing and wherein at least parts of the second section are formed by an enclosure and wherein at least parts of the second section are arranged inside of the first section, wherein the first section of the at least two sections is provided for introducing ambient air and separating the components of introduced air, the first section comprising an air inlet, located at one end of casing, an air outlet plug, located at the other end of the of casing, opposite to said air inlet, and an enriched air outlet, located in close proximity to said air outlet plug and wherein the second section of the at least two sections is provided for discharging separated components from introduced ambient air, the second section comprising a sealing plug located at one end of enclosure, the said end being in proximity of air inlet, the other end of enclosure forming waste air outlet, and wherein spiral guiding surfaces and at least one slot are arranged on a surface of said enclosure, the device further comprising at least two electrodes arranged inside the oxygen enriching device, wherein at least one electrode is positively charged and at least one electrode is negatively charged, wherein the positively charged electrode encloses the negatively charged electrode.

In preferred embodiment, a casing as part of the chamber and/or an enclosure as part of the chamber is substantially formed as a body of revolution.

In a preferred embodiment, at least one guide rail is a spiral guiding surface and in that on the edges of the at least one guide rail conductive material is arranged.

The conductive material is preferred to be carbon fibre which is suitable for electron emission.

In a preferred embodiment, the positively charged electrode is arranged in close proximity to the inner surface of casing and the negatively charged electrode is arranged in close proximity to the outer surface of enclosure or forms at least a part of enclosure.

In a preferred embodiment, at least one centring collar is arranged on outer surface of the enclosure.

In a preferred embodiment, at least the one centring collar forms a cable port for electrical connections and/or forms an air outlet for enriched air in the casing of the chamber.

In a preferred embodiment, a ventilator is arranged in close proximity to the waste air outlet.

The flow velocity depends on the operating status of the ventilator. Therefore, an increase in the speed of the ventilator leads to an increase in the flow velocity of the ambient air which further increases the Ranque-Hilsch effect.

In a preferred embodiment, a flow gap is arranged in between the positively charged electrode and the at least one guide rail.

In a preferred embodiment, a flow gap is arranged on the inner surface of the positively charged electrode in a direction towards the negatively charged electrode.

In a preferred embodiment, a barrier layer and/or a catalytic layer is arranged on the inner surface of the positively charged electrode in direction towards the negatively charged electrode.

In a preferred embodiment, a barrier layer and/or a catalytic layer is arranged between the surface of the positively charged electrode and a casing for the chamber.

The catalytic layer preferably consist of or comprises at least one very thin layer which is arranged on the surface of the barrier layer. Further, the catalytic layer preferably contains metal oxides, such as zinc oxide, cadmium oxide, nickel oxide or copper oxide, with the periodic group containing zinc being especially preferred. The catalytic layer is preferably dried by a high-voltage field for the orientation of the dipole field. The drying process may be additionally supported by purging the catalytic layer with heated nitrogen. Especially preferred is the orientation of the dipole towards the negatively charged electrode.

The barrier layer preferably consists of or comprises metal oxides, such as aluminium oxide.

According to the present invention "optimising" relates to any kind of improvement of combustion processes. This improvement may be related in the sense of the present invention to the reduction of fuel consumption, increase of efficiency, engine efficiency, system effectiveness and/or energy efficiency. This improvement may also be related to wear and tear, erosion, deterioration and/or abrasive wear of devices in which combustion takes place or is used.

In association with the present invention, "combustion devices" are any devices that use combustion technologies in general. Combustion technologies can be used, for example, for motor engines, aircraft turbines, heaters, radiators, jets or industrial furnaces and kilns, such as cement kilns, rotary kilns or drawing furnaces. Combustion devices in the sense of the present invention relate to all combustion technologies that use any kind of fuel that can be combusted in order to convert energy.

Additional objects, aspects, features, and advantages of the present invention will be set forth in part in the description which follows, and in part will be obvious from the description or may be learned by practice of the invention.

In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIG. 3 is an enlarged fragmentary perspective view of the oxygen enriching device of FIG. 1, FIG. 4 is a schematic representation of a first, alternative embodiment of an electrode assembly comprising the positively charged electrode of FIG. 2, and FIG. 5 is a schematic representation of a second alternative embodiment of an electrode assembly comprising the positively charged electrode of FIG. 2.

DETAILED DESCRIPTION OF THE INVENTION

Figure 1:
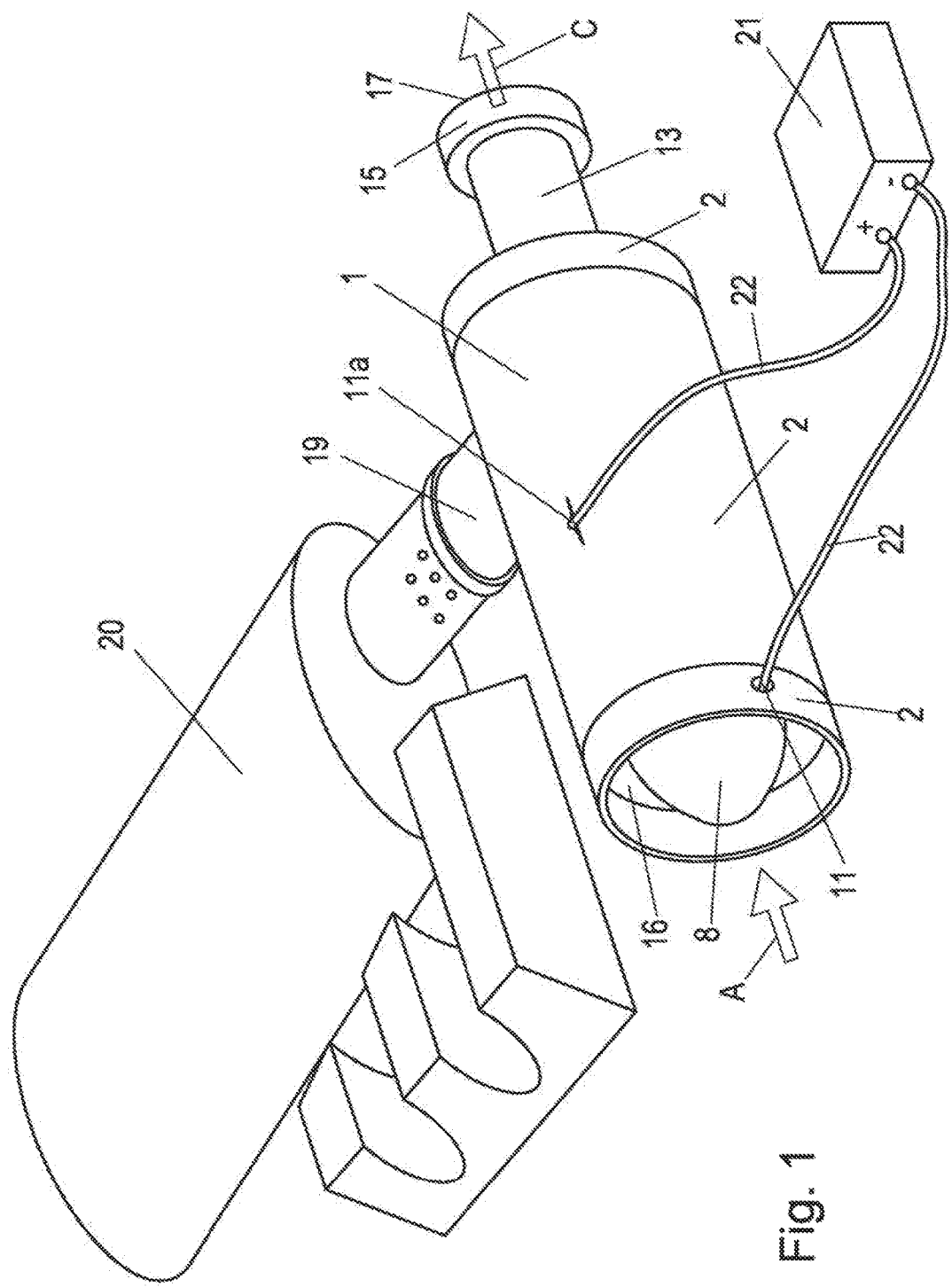
FIG. 1 is a perspective representation of one embodiment of system comprising an oxygen enriching device according to the present invention and a combustion device.

The present invention is directed, at least in part, at a method for optimising combustion in combustion technologies.

The method, according to the present invention is based on the principle of the partial separation of nitrogen and the increase of the amount of oxygen during a combustion process, whereby the combustion process is simplified and dramatically enhanced.

The method, according to the present invention, operates only in the air inlet of the combustion technology where the ambient air is either introduced by suction feed or by air injection and does not intervene with the combustion technology itself. The device used to perform the method according to the present invention is compatible and easily adaptable to existing combustion technologies. Therefore, the device can advantageously be retrofitted to existing combustion technologies or combustion devices.

The method, according to the present invention, is performed using a device that includes an arrangement for guiding combustion air.

A pulsed direct current electric field produced by at least two electrodes which are arranged inside a chamber of the device, according to the present invention. At least one electrode is negatively charged and at least one electrode is positively charged, whereas the positively charged electrode encloses the negatively charged electrode.

In between the electrodes, a pulsed voltage is generated which causes electron emission. Further, peak voltage is caused between the surface of the spiral guiding surfaces, which are arranged on the enclosure of the negative-charged electrode, and the positively charged electrode.

According to the method of the present invention, ambient air is introduced through an air inlet into a first section of the chamber of the device of the present invention. The ambient air flow is introduced in a translational movement which is converted into a rotational movement by the spiral guiding surfaces that are arranged on the enclosure of the negatively charged electrode.

Ionisation energy in the form of a pulsed direct current electric field, which is produced due to the different potentials of the electrodes, is applied on the introduced ambient air while being converted into a rotational movement. The specific frequency of the pulsed current used, according to the present invention, causes vibration. The vibration may be optimised in respect to overtunes of the molecule vibration.

The ionisation of the ambient air flow leads to a separation of ionisable components from non-ionisable components by the pulsed direct current electric field. Ionisable components are selected from oxygen containing components of the ambient air such, as water, carbon dioxide, formaldehyde or acids.

The ionised negatively charged molecules change their trajectory away from the negatively charged electrode towards the positively charged electrode and are then further guided into the combustion. The non-ionised, much slower molecules, such as nitrogen are discharged through slots, which are arranged on the surface of the negatively charged electrode, into the environment.

By using the method and the device as described herein, it is therefore possible to enhance the efficiency and to reduce the emission of combustion technologies or combustion devices that consume ambient air. Therefore, the dramatically enhanced combustion leads to a reduction of sooty particles, fine particles, nitrogen oxides or sulphur and its oxides.

Further, another advantage of the method of the present invention is the enhanced fuel saving, especially in combustion technologies, such as combustion engines. This leads to a reduction of the total costs.

It is also advantageous that the efficiency of combustion technologies is increased by virtue of the method of the present invention which leads to a reduced friction. Advantageously, the reduced friction results in reduced noises such as engine noises and also in a decreased number of wear parts that are required, further leading to a reduction of total costs. This leads also to higher efficiencies of the combustion devices.

The following examples shall explain the present invention. The examples shall be understood only as preferred embodiments of the invention. It is not intended to limit the present invention to the scope of the given examples. FIG. 1 shows a preferred embodiment of a device for performing the method, according to the present invention, to optimise the combustion in a combustion technology.

FIG. 1 shows an oxygen enriching device 1, according to the invention, which is connected by an adaptor 19 to a combustion device 20. Ambient air, shown as arrow A, is introduced into the oxygen enriching device 1. Oxygen enriching device is formed basically from casing 2 and enclosure 13. Enclosure 13 is provided with a sealing plug 8, located in proximity to air inlet 16. After enriching ambient air inside the chamber, enriched air is guided by adapter 19 into a combustion device 20. Waste air is guided into enclosure 13 by slots (not shown), located on the surface of enclosure 13. Waste air is released through waste air outlet 17 into the environment. A ventilator 15 is provided to remove waste air from the enclosure 13, shown as arrow C. The process of oxygen enriching of ambient air requires a pulsed direct current electric field, which is provided by power supply 21. Electrodes (shown in FIG. 2) are located inside the chamber and, are connected to power supply 21 by electrical connections 22.

Figure 2:
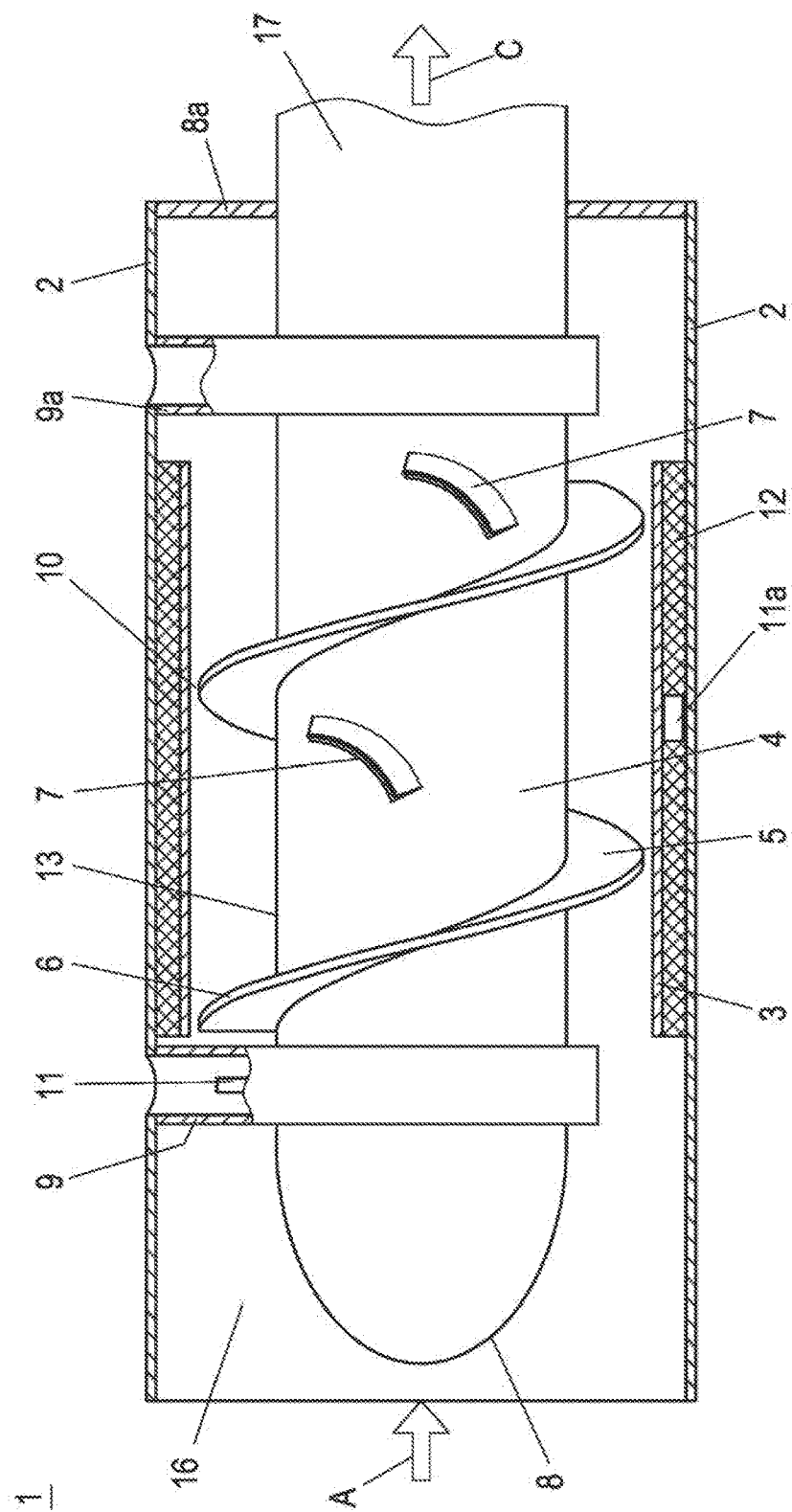
FIG. 2 is a fragmentary schematic representation of the oxygen enriching device of FIG. 1.

Now referring to FIG. 2, one embodiment of an oxygen enriching device 1 is shown. The device, according to the present invention, in form of means for guiding combustion air, comprises an oxygen enriching device 1. The oxygen enriching device 1 comprises a chamber comprising at least two sections. The first section serves for the introduction of ambient air and serves for the separation of the components of the introduced ambient air. The first section is mainly, and/or at least in parts, formed by casing 2.

The second section of the chamber serves for discharging waste air into the environment. The second section is mainly, and/or at least in parts, formed by enclosure 13. Furthermore, parts of enclosure 13 may form the negatively charged electrode 4. In the context of the present description "enclosure" 13 and "negatively charged electrode" 4 may be used as synonyms.

In other words, the first section of the chamber comprises an air inlet 16 and an enriched air outlet 18, and the second section of the chamber comprises at least a waste air outlet 17. In this embodiment the casing 2 is made of a material that is electrically conductive. Inside the casing 2, at least two electrodes 3, 4 are arranged. At least one electrode 3 is positively charged and at least one electrode 4 is negatively charged. Both electrodes 3, 4 are arranged coaxially to oxygen enriching device 1. Further, the positively charged electrode 3 encloses the negatively charged electrode 4, whereas both electrodes 3, 4 are not in direct contact with each other, leaving at least a flow gap 10 in between them.

In another embodiment, an air humidifying device (not shown) or air moisturizing device (not shown) may be arranged in close proximity to air inlet. 16. The air moisturizing device is arranged in flow direction A (arrow A) so that ambient air is moistened, which facilitates further ionization of ambient air in oxygen enriching device 1.

In the present embodiment, the casing 2 and the enclosure 13 are presented in form of pipes, however, it is to be understood that any kind of body of revolution can be used for casing 2 and enclosure 13, depending on the application to which the device of the present invention is used.

The casing 2 in this embodiment is, made of any material which may be electrically conductive, such as metals, carbon fibres or composite materials thereof. In one embodiment, casing 2 is made from aluminium and is EMC-safe on the outside. Inside of casing 2, especially at least in the region of positively charged electrode 3, isolation material 12 is positioned.

In this embodiment, casing 2 and enclosure 13 are coaxially arranged, wherein enclosure 13 in placed inside of casing 2. Centring collars 9, 9a are provided, in order to maintain enclosure 13 centred inside casing 2. Centring collar 9 holds enclosure 13 in close proximity to air inlet 16 and centring collar 9a holds enclosure 13 in close proximity to waste air outlet 17. As casing 2 and enclosure 13 are in form of pipes, casing 2 and enclosure 13 are open-ended on both respective sides. Therefore, enclosure 13 comprises a plug 8 on the side that is directed to air inlet 16. Plug 9 may advantageously be in form of a paraboloid of revolution, and the like, in order to minimize flow resistance of incoming air. The other side of enclosure 13 is left open and this open side extends out of casing 2, thereby forming waste air outlet 17. On the other hand, casing 2 is open in direction to air inlet 16 so that ambient air can flow into casing 2. On the opposite side, plug 8a is provided in order to close casing 2. Plug 8a is formed in order to allow enclosure 13 to extend through plug 8a.

Further, a ventilator 15 may be arranged in close proximity to sealing plug a or may be connected to the sealing plug 8a in order to accelerate the air flow velocity in direction of arrow C.

In the embodiment, as shown in FIG. 3, plug aa and centring collar 9a may be combined with each other, in order to simplify manufacture of the device according to the invention. In that respect, centring collar 9a may also form enriched air outlet 18, leading to adapter 19, for example.

It is provided that at least parts of enclosure 13 may serve as negatively charged electrode 4, also called cathode 4. In order to charge cathode 4, electrical connection 11 is provided. In the embodiment shown in FIG. 2, centring collar 9 may be used in order to attach electrical connection 11 to cathode 4. It is clear, that centring collar 9a may also be used to attach an electrical connection, if required. In that respect it is apparent that parts of enclosure 13, that serve as cathode 4, must provide an electrical conductivity. In this embodiment, cathode 4 extends to a region that is limited by centring collar 9 on one side and centring collar 9a on the other side.

Further, on the outer surface of enclosure 13, preferably in the region of the negatively charged electrode 4, spiral guiding surfaces 5 are arranged, which preferably, have at least the following two important functions:

On the one hand, the spire guiding surfaces 5 are important for converting the ambient air flow that is introduced into the first section of the chamber from a translational movement into a rotational movement. The conversion advantageous in order to accelerate the motion of the molecules of the gas. Further, a stratification of the air or gas molecules is caused by the Ranque-Hilsch effect, which supports the separation of nitrogen.

On the other hand the spiral guiding surfaces 5 are also important for conductance of the applied voltage. The conductivity of guiding surfaces 5 has to be adjusted according to the intended use of the device according to the invention.

Voltage is applied on the positively charged electrode 3 by electric connections 11a. Further, as also shown in FIG. 2, the positively charged electrode 3 is isolated from the casing 2 by an isolation material 12. The isolation material 12 is important in order to avoid a short circuit in embodiments where the casing 2 is made of conductive material as well.

On the surface of the enclosure 13, preferably in the on of the negatively charged electrode 4, is at least one guide rail 5 arranged forming spiral guiding surfaces 5. A high voltage wire is arranged on the edges 6 of the at least one guide rail 5. Instead of a wire, the edges 6 may be covered with or made out of a conductive material such as carbon fibres, fibre brushes and the like. The applied voltage is conducted by the high voltage wire, which is positioned in between the positively charged electrode 3 and the negatively charged electrode 4.

In other embodiments, the edges 6 may be made from a material that must not be conductive but appropriate to emit electrons in an appropriate quantity and velocity, so that the demands of the combustion device are met.

A pulsed direct current electric field is produced due to a different potential between the two electrodes 3, 4, which is used as ionization energy.

The chosen frequency of the pulsed direct current electric field causes a resonance in the form of vibration, which leads to an ionisation of ionisable components of the introduced ambient air. Ionisable components are chosen from oxygen containing components, such as oxygen, water, carbon monoxide, carbon dioxide, formaldehyde and/or acids, whereas nitrogen is nonionisable. The pulsed direct current electric field accelerates the negatively charged ions.

The negatively charged oxygen containing components change their trajectory away from the centre of the negatively charged electrode 4 to the positively charged electrode 3, caused by the ionisation of the introduced ambient air flow. To the contrary, the non-ionised components, such as nitrogen keep their trajectory in a straight manner in the centre of the negatively charged electrode 4.

According to the invention, the air flow that mostly contains non-ionised nitrogen is discharged trough at least one slot 7, which is arranged on the surface of the enclosure 13, out of the second section of the chamber (in a direction of arrow C) of the device into the environment.

Now referring to FIG. 3, the embodiment of a part of the chamber with the air outlet plug attachable to the combustion device is shown. It is shown that part of casing 2 forms an adapter 19 that directs enriched air through enriched air outlet 18 to combustion device 20. Ambient air, having a flow direction indicated with arrow A, is directed into oxygen enriching device 1. Casing 2 is closed with sealing plug 8a, sealing plug 8a being arranged opposite to air inlet 16 (shown in FIG. 2), so that air flow of oxygen enriched air is guided through enriched air outlet 18 into adapter 19. This air flow is indicated with arrow B. Non-ionized components have entered enclosure 13 through slots 7 (as shown in FIG. 2) and form waste air that is discharged from oxygen enriching device though waste air outlet 17. The waste air has a flow direction indicated with arrow Discharging of waste air may be optimized using a ventilator 15, the ventilator being arranged in close proximity to waste air outlet 17.

In one embodiment of the present invention, adapter 19 may be in form of fastening means that clasp around casing 2.

The air flow mostly containing the ionised oxygen containing components, also called enriched air, is guided through outlet 18, which is formed in the surface of casing 2. Enriched air outlet 18 forms a blow out opening into the combustion chamber 20.

In another embodiment, magnets (not shown), such as electric or permanent magnets, may be arranged outside the oxygen enriching device 1, which produce a magnetic field inside the oxygen enriching device 1, especially in the first section of the chamber where the ionisation of the introduced ambient air occurs. The magnetic field can also be produced by a pulsed inductor instead of magnets arranged outside the oxygen enriching device 1. The trajectory of the negatively charged oxygen containing components is further curved towards the positively charged electrode 3 due to the influence of the magnetic field. The magnetic field has no influence on nitrogen or nitrogen containing compounds. The magnetic field applied may be in the range of 0.1 T-10 T.

Furthermore, the magnetic field is also required for moving the oxygen containing components away from the catalytic layer 14b (shown in FIG. 4). Therefore, the use of a magnetic field leads to a more efficient reactivation of the catalytic layer 14b and to a further movement, of the oxygen containing components into the combustion.

FIG. 4 is a schematic representation of a first alternative embodiment of an electrode assembly comprising the positively charged electrode 3 of FIG. 2.

In the embodiment of FIG. 4, the electrode assembly comprises five structures, which are preferably stacked directly upon one another, the order of the structures being the following; casing 2, isolation material 12, electrode 3, barrier layer 14a and catalytic layer 14b.

The first structure of assembly is the casing 2, which is the surrounding layer of the device of the present invention. The outer surface of the casing 2 is therefore in contact with the environment. The casing 2 is a body of revolution, whereas the exact form depends on the use of the device, according to the present invention. Further, the casing 2 has an isolating function for the device of the present invention towards the environment. The positively charged electrode 3 with its required electric connections 11a is carried by the casing 2. The casing 2 is suitable for temperatures up to 600° C. and has a thickness between preferably 0.5-3 mm. In this embodiment the casing may consist, of a material that is conductive.

In this embodiment, the second structure is an isolation material 1 which is arranged between the casing 2 and the positively charged electrode 3. This isolation material 12 is required when the casing 2 consists of a material that is conductive in order to avoid any short circuit due to the electric conductivity that would occur between the casing 2 and the positively charged electrode 3 without any isolation material 12. Further the isolation material 12 is required in order to shield the high voltage.

The third structure in this embodiment is the positively charged electrode 3. The positively charged electrode 3 consists of a very thin good electrically conductive material, such as copper.

In some embodiments, the positively charged electrode 3 may also be used as casing 2 as well. In such embodiments an isolating layer would be required to be applied on the cuter surface of the positively charged electrode 3.

The fourth structure shown in FIG. 4 is the barrier layer 14a. The barrier layer 14a is preferably made of aluminium oxide and has a preferred thickness of approximately 100 μm. The barrier layer 14a has two important functions. The first function is to isolate the positive pole in order to enable the electric field. The disruptive voltage is in the range of approximately 5 kV to 100 kV, preferably 30 kV to 80 kV.

Secondly, the barrier layer 14a is the carrier for the catalytic layer 14b.

The fifth structure of the embodiment shown in FIG. 4 is the catalytic layer 14b, which consists of two parts. The first part serves as a resonance layer for the second part of the catalytic layer 14b, which is the activating part of the catalytic layer 14b.

The first part of the catalytic layer 14b is made of 4 to 6 layers that might consist of silicon dioxide and has a total thickness of 50 μm. Those first layers of the first part of the catalytic layer 14b have very strong piezoelectric properties with a positively charged dipole that is directed to the negatively charged electrode (not shown).

Fine particles are added to the final layer of the first part of the catalytic layer 14b in order to increase the surface and to create islets of electrons as highly reactive centres. This leads to a reduced flow resistance and accelerates the negatively charged components towards the combustion chamber. The fine particles used according to the invention may be selected from ferro electrical and/or piezo electrical nano particles.

The second part of the catalytic layer 14b is the finish in layer which is a very thin layer of approximately 25 nm thickness. The finishing layer is procedurally applied as an undulated thin film. The finishing layer functions as an activating layer of the catalytic layer 14b which enables water molecules and carbon dioxide to be broken down into their active atoms at ambient temperature. The catalytic layer 14b is also required for hydrolysis and for energising oxygen and its radicals.

In FIG. 5 there is shown a second alternative embodiment of an electrode assembly comprising positively charged electrode 3.

In this embodiment, the electrode assembly consists of four structures, which are preferably stacked directly upon one other, the order of the structures being the following: casing 2, electrode 3, barrier layer 14a and catalytic layer 14b.

In comparison to the embodiment shown in FIG. 4, the embodiment of FIG. 5 has no layer consisting of isolation material 12. Therefore, in this embodiment, casing 2 has to consist of material that is electrically insulating, such as plastic material. Otherwise, if casing 2 and the positively charged electrode 3 both consist of material that is electro-conductive a short circuit might occur, as no isolation material is arranged between the casing 2 and positively charged electrode 3. Besides this difference, the correlating structures of this embodiment have the same composition and functions described for the structures in FIG. 4.

According to the invention, electrons are present in excess and preferably ionise the oxygen of the ambient air preferably into dianions. Further, the electrons are distributed on the surface of the catalytic layer 14a of the positively charged electrode 3, causing silent discharges which form a cold highly reactive plasma. The formed plasma is pushed into the direction of the combustion chamber by the piezoelectric impulse caused by the catalytic layer and/or the optional magnetic field. The aggressiveness of the plasma towards the combustible molecules leads to a dramatically enhanced combustion.

Excessive electrons close gaps and increase the thermal conductivity due to energy transfer. Furthermore, electrons have a cleaning function as they dissolve deposits and supply the deposits to the combustion.

The dipoles of the piezoelectric layer in the catalytic layer are continuously changed due to the high voltage impulses applied. This causes attraction and repel of electrons, anions, dipoles, reactants and products, which forms a negatively charged plasma gas. The velocity of the plasma gas is increased due to the electron emission, the flow, the piezoelectric impulse and the pulsed magnetic field.

The following experiments have been carried out to demonstrate the advantages of the present invention.

A 2002 Model Year Volkswagen Jetta TDI 4 Cylinder Diesel engine was used.

The test was performed according to Highway Fuel Economy test (HWFET).

Table 1 shows the results of the test. Test A and B have been performed as baseline test. Tests 1 to 6 have been performed using device according to the embodiment as described in FIGS. 2 and 3.

The follow ng parameters have been applied:
HV: 9±3 kV
Pulse frequency: 5±2 kHz
Pulse interval ratio: 1:1 to 1:5

TABLE 1

| Test | CO | NOx | CO2 | L/100K |
|---|---|---|---|---|
| A | 0.092 | 1.631 | 215.780 | 4.910 |
| B | 0.092 | 1.423 | 199.210 | 4.532 |
| Average | 0.092 | 1.527 | 207.495 | 4.720 |
| 1 | 0.094 | 1.377 | 191.700 | 4.360 |
| 2 | 0.089 | 1.496 | 207.840 | 4.730 |
| 3 | 0.086 | 1.408 | 194.630 | 4.430 |
| 4 | 0.086 | 1.343 | 188.350 | 4.290 |
| 5 | 0.086 | 1.435 | 200.944 | 4.570 |
| 6 | 0.089 | 1.432 | 198.185 | 4.510 |
| Average | 0.088 | 1.415 | 196.942 | 4.482 |

The fuel consumption has been reduced about 5% and the amount of NOx gases has been reduced by >5%.

The embodiments of the present invention described above are intended to be merely exemplary and those skilled in the art shall be able to make numerous variations and modifications to it without departing from the spirit of the present invention. All such variations and modifications are intended to be within the scope of the present invention a defined in the appended claims.

REFERENCE SIGNS 1 oxygen enriching device
2 casing a parts of the first section of a chamber
3 positively charged electrode, anode
4 negatively charged electrode, cathode
5 guide rail
6 edges
7 slot
8 sealing plug
8a air outlet plug
9 centring collar
91 centring collar
10 flow gap
11 electric connection
11a electric connection
12 isolation material
13 enclosure as parts of the second section of a chamber
14a barrier layer
14b catalytic layer
15 ventilator
16 air inlet
17 waste air outlet
18 enriched air outlet
19 adaptor to combustion device
20 combustion device
21 power supply
22 electrical connections
A flow direction of ambient air
B flow direction of enriched air
C flow direction of waste air

The invention claimed is:

1. A method for optimising combustion in combustion devices, the method comprising the following steps:
   a) providing an oxygen enriching device, wherein the oxygen enriching device comprises a chamber, the chamber comprising at least two sections,
   b) introducing ambient air in a laminar flow into a first section of the at least two sections,
   c) converting the laminar air flow from a translational movement into a rotational movement using spiral guiding surfaces disposed inside the first section of said at least two sections,
   d) ionising ionisable components of the ambient air by applying ionisation energy thereto in form of a pulsed direct current electric field,
   e) separating ionised components from non-ionised components by using the electric field, guiding the separated ionised components over a catalytic layer, and introducing the separated ionised components into a combustion chamber of a combustion device, and
   f) discharging the separated non-ionised components from the oxygen enriching device by passing separated non-ionized compounds from the first section into the second section.

2. The method according to claim 1, wherein the ambient air in step b) is introduced by suction feed and/or by air injection.

3. The method according to claim 1 or 2, wherein the ambient air in step b) is moistened during introduction.

4. The method according to claim 1, wherein the direct current in step d) is between 5 kV-100 kV and wherein the pulse in step d) has a frequency that is between 5 Hz-60 kHz.

5. The method according to claim 1, characterized in that the ionisable components in step d) are chosen from oxygen containing components of the ambient air.

6. The method according to claim 1, characterized in that step d) additionally a magnetic field is applied.

7. The method, according to claim 1, characterized in that the separation in step e) feeds oxygen components of the air into the combustion device whereas nitrogen components of the air in step f) are released into the environment.

8. Device for applying the method according to claim 1, comprising an oxygen enriching device, wherein the oxygen enriching device comprises a chamber comprising at least two sections, wherein at least parts of the first section are formed by a casing and wherein at least parts of the second section are formed by an enclosure and wherein at least parts of the second section are arranged inside of the first section,
   wherein the first section of the at least two sections is provided for introducing ambient air and separating components of introduced air, the first section comprising an air inlet, located at one end of casing, an air outlet plug, located at the other end of the of casing, opposite to said air inlet, and an enriched air outlet, located in close proximity to said air outlet plug,
   and wherein the second section of the at least two sections is provided for discharging separated components from introduced ambient air, the second section comprising a sealing plug located at one end of enclosure, the said end being in proximity of air inlet, the other end of enclosure forming waste air outlet, and wherein spiral guiding surfaces and at least one slot are arranged on a surface of said enclosure;
   the device further comprising at least two electrodes arranged inside the oxygen enriching device, wherein at least one electrode is positively charged and at least one electrode is negatively charged, wherein the positively charged electrode encloses the negatively charged electrode.

9. The device according to claim 8, characterized in that the casing as part of the chamber and/or the enclosure as part of the chamber is substantially formed as a body of revolution.

10. The device according to claim 8, characterized in that at least one guide rail is a spiral guiding surface and in that on the edges of the at least one guide rail conductive material is arranged.

11. The device according to claim 8, characterized in that the positively charged electrode is arranged in close proximity to the inner surface of casing and in that the negatively charged electrode is arranged in close proximity to the outer surface of enclosure or forms at least a part of enclosure.

12. The device according to claim 8, characterized in that means are arranged outside the oxygen enriching device for applying a magnetic or pulsed magnetic field inside the oxygen enriching device.

13. The device according to claim 8, characterized in that at least one centering collar is arranged on outer surface of enclosure.

14. The device according to claim 13, characterized in that at least the one centering collar forms a cable port for electrical connections and/or forms an air outlet for enriched air in casing of the chamber.

15. The device according to claim 8, characterized in that a ventilator is arranged in close proximity to waste air outlet.

16. The device according to claim 8, characterized in that a flow gap is arranged in between the positively charged electrode and the at least one guide rail.

17. The device according to claim 8, characterized in that a barrier layer and/or a catalytic layer is arranged on the inner surface of the positively charged electrode in a direction towards the negatively charged electrode.

18. The device according to claim 8, characterized in that an air humidifying device or air moisturizing device is arranged in close proximity to air inlet.

* * * * *